(No Model.)
L. BOWLES.
BICYCLE SUPPORT.
No. 585,616. Patented June 29, 1897.
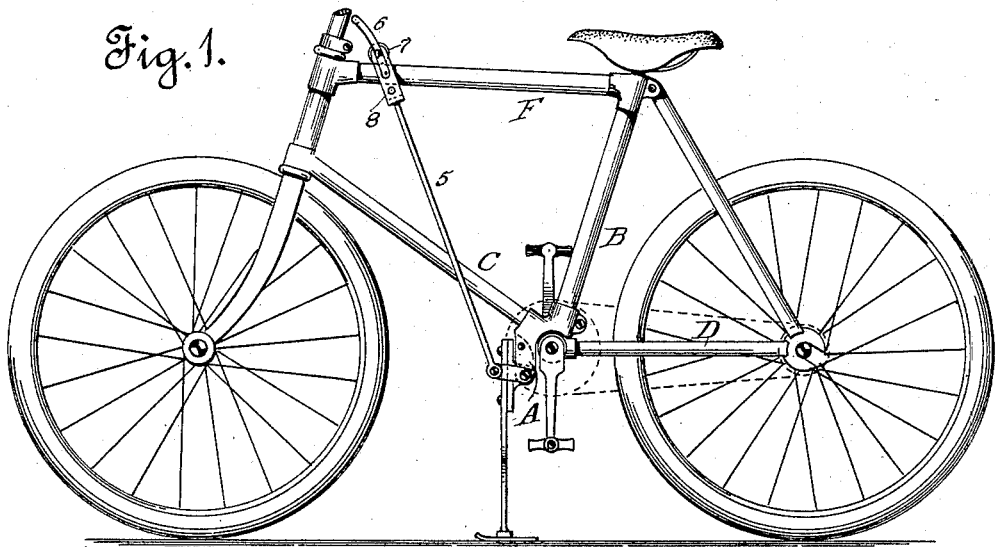
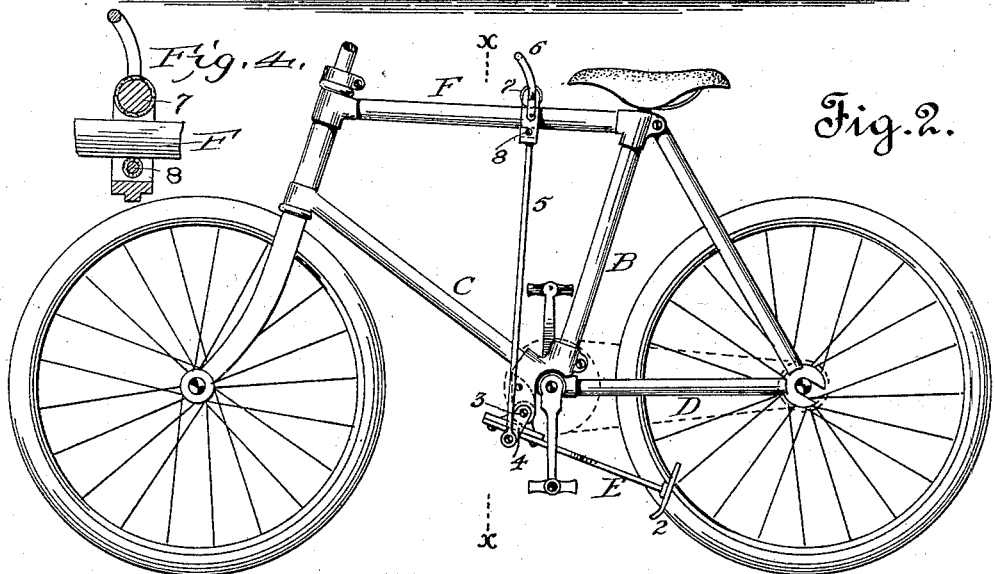
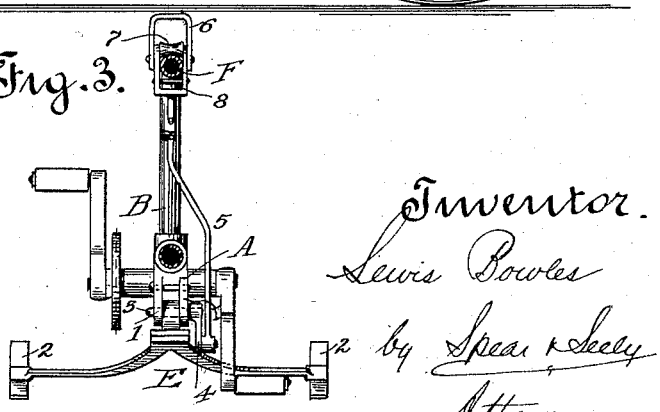
Witnesses.
H. Monteverde
M. K. Seely
Inventor.
Lewis Bowles
by Spear & Seely
Attorneys

UNITED STATES PATENT OFFICE.

LEWIS BOWLES, OF SAN FRANCISCO, CALIFORNIA.

BICYCLE-SUPPORT.

SPECIFICATION forming part of Letters Patent No. 585,616, dated June 29, 1897.

Application filed April 9, 1896. Serial No. 586,836. (No model.)

*To all whom it may concern:*

Be it known that I, LEWIS BOWLES, a citizen of the United States, residing at San Francisco, in the county of San Francisco and State of California, have invented certain new and useful Improvements in Bicycle-Supports; and I do hereby declare that the following is a full, clear, and exact description thereof.

My invention relates to means for supporting a bicycle so as to enable it to stand at any time with or without a rider.

The object of my invention is to provide a bicycle with a simple and convenient supporting device carried by the framework and capable of being operated by the rider whether mounted or dismounted. Such device in one position is out of the way and is simply carried by the wheel until it is necessary to use it. In the other position it forms a support which holds the bicycle upright while the rider is in the saddle or when he is dismounted and wishes to leave his wheel.

My invention is illustrated in the accompanying drawings, in which—

Figure 1 is a side view of a bicycle with my support in position to hold the same upright. Fig. 2 is a similar view with the support turned upward out of the way. Fig. 3 is a cross-section of the frame on line $x\ x$, giving a front view of the support in the position of Fig. 2. Fig. 4 is a detail view.

My support is shown in the drawings as applied to a bicycle of the common diamond-frame type. A bracket A is secured at the intersection of the tubes B C D of the frame or may form part of the coupling which connects two or all of such tubes. The bracket is shown as having two downwardly-projecting ears 1 1, in which is journaled the forked support E. The support consists of the two arms, which extend sidewise in opposite directions and are preferably provided with feet 2 2, adapted to rest upon the ground and having their front ends slightly upturned, as shown. The two arms form one piece and are secured upon the pin 3, which is journaled in the bracket A and carries at one end a crank 4. To the end of this crank is pivoted a lever 5, which at its upper end is formed so as to embrace the upper tube F of the diamond frame and is provided with a handle 6. A small roller 7 is journaled in the slotted end of the lever, which bears upon the tube F, and a similar roller or, as shown, a cross-bar 8 bears upon the lower surface of the tube. Both the roller 7 and bar 8 may be covered with leather or other soft material to protect the finish of the tube. The length of the tube F allows a range of movement in the handle sufficient to throw the crank far enough to operate the support from the position of Fig. 1, where it is resting on the ground, to that of Fig. 2, where it is seen thrown up from the ground and held a few inches above the same entirely out of the way. The tube F in connection with the guide-roller acts as a lock to hold the handle back near the saddle and also as a guide to produce the partial rotation of the crank which operates the support.

In either position the handle is within easy reach of the rider, while, as shown in Fig. 3, the support when elevated is entirely out of the way and is very little, if any, wider than the normal tread of the machine.

The device forms a perfect support for the wheel whether the rider is mounted or not, and can be made exceedingly light, so as to add very little to the weight. There is a large class of riders willing to carry a little extra weight in consideration of the convenience of being able to stop and stand or to have the assistance in mounting which this supports affords, and to such riders the advantages of my device are obvious and plain.

While I have shown the shoes herein provided with upturned ends, I do not wish to confine myself to any particular form, as the support E may be provided with any form of rest without departing from the spirit of this invention.

In Fig. 4 I have shown a roller in lieu of the bar 8, and this roller, as well as the roller 7, is covered with leather.

What I claim is—

In combination with the diamond frame of a bicycle having an upper horizontal tube, a support journaled in the frame between the wheels, an operating-crank on said support, a lever connected to said crank, and having a bearing on the said upper tube, whereby the straight movement of said lever on the tube, produces a partial rotary movement of said crank and support, substantially as described.

In testimony whereof I have affixed my signature, in presence of two witnesses, this 31st day of March, 1896.

LEWIS BOWLES.

Witnesses:
L. W. SEELY,
JOHN W. HALL.